3,041,184
MEAT WRAPPER CONTAINING ANTIBIOTIC
Edward Hartshorne, Stony Creek, Conn., assignor to Olin Mathieson Chemical Corporation, a corporation of Virginia
No Drawing. Filed May 19, 1958, Ser. No. 735,923
5 Claims. (Cl. 99—174)

This invention relates to packaging material, and has for its object the provision of an improved sheet material for packaging fresh or processed meat, poultry and fish, hereinafter called "meat." The invention is based upon the discovery that the shelf-life of meat may be extended very appreciably by wrapping the meat in sheet material containing certain antibiotics. In accordance with this invention, a suitable cellulosic sheet material, such as cellophane, butcher's paper, vegetable parchment, cotton or other cloth as used by meat packers, and the like, is coated or impregnated with certain water-soluble antibiotics, and results in sheet wrappers for meat which increase the shelf-life thereof.

This application is a continuation-in-part of my co-pending application Serial Number 584,448 filed May 14, 1956, now abandoned.

Based on an extensive investigation, it has been found that cellulosic sheet materials containing small but uniformly distributed amounts of the water-soluble broad spectrum antibiotics, such as polymyxin B, tetracycline, chlortetracycline, oxytetracycline, neomycin, and streptomycin effectively inhibit the discoloration, loss of flavor and spoilage and thus extend the shelf-life of meat packaged therein. The term "broad spectrum antibiotics" refers to antibiotics which effectively inhibit the growth of a wide variety of bacteria, particularly, the types responsible for meat spoilage. Other antibiotics, such as penicillin, subtilin and actinomycin are ineffective for the purpose. The term "shelf-life" refers to the period of storage at temperatures of 33°–50° F. during which the meat retains a low bacterial count such that discoloration, off-flavor and off-odor do not develop.

In accordance with this invention, the deteriorating effects of harmful bacteria are inhibited by wrapping the meat in a sheet containing very small amounts of the antibiotic. An outstanding and surprising feature in this connection is that the control is substantially the same regardless of the size and shape of the pieces of meat. For example, a very thick steak can have about the same extension of shelf-life as a thin steak when both are wrapped in the same material. Thus, far greater effectiveness of a given amount of antibiotic is obtainable than with other methods heretofore tested.

In the case of freshly ground hamburger, a form of meat which is highly susceptible to bacterial deterioration, the shelf-life may be extended from the present value of from 5 to 12 hours to about 48 hours. The shelf-life of a round, porterhouse or sirloin steak may be extended from the present 24 to 48 hours to about 96 hours.

The cellulosic paper, cloth or film sheet material of the invention may be coated or impregnated with from 5 to 25 mg. of antibiotic per square meter of sheet area either simultaneously with or following the application of an aqueous solution of softener. The improved sheet material of the invention may be prepared by coating or spraying the sheet or immersing the sheet in a solution of the antibiotic and then evaporating the solvent under low temperature conditions, for example about 100° F., to prevent injury to the antibiotic. Aqueous solutions which may contain glycerol or propylene glycol and containing from 2,000 to 3,000 parts per million of the antibiotic may be used for these purposes. The entire operation of applying the antibiotic and storage of the sheets prior to use should be carried out with suitable precautions to prevent impairment of the antibiotic.

In the production of cellophane, one means of incorporating the antibiotic in the film is to dissolve a sufficient amount of antibiotic, about 2,000 to 3,000 parts per million, in the tank containing the softener solution. When the cellophane sheet is drawn through the solution, it absorbs enough antibiotic to extend the shelf-life of meat wrapped in the sheet. The softener solution should be maintained at about room temperature and excess water should be evaporated from the film at a temperature of 150° F. or lower at which the antibiotic is not decomposed.

Generally, the preferred procedure for providing the desired content of antibiotic in the wrapping material is to apply a solution to one surface of the cellulosic base sheet by spraying or by roller or plate coating, as in a printing operation. Preferably, the solution is aqueous and may advantageously contain glycerol or propylene glycol and contains an amount of water desired to be retained in the wrapping material. Thus, the material may immediately be wound into rolls without further treatment. In making a preferred wrapper in accordance with this invention, cellophane is provided with a moisture-proof coating on one surface, dried, and partly rehumidified in accordance with conventional practice, but is treated on the other surface with an aqueous solution of antibiotic just before it is wound into roll form. The solution is of such concentration as to provide 5 to 25 mg. of antibiotic per square meter of film and an amount of water desired to be retained in the film. If desired, the rehumidification may be effected to a lesser extent than is customary, in which case, the antibiotic solution may be applied as a more dilute solution.

Thus, the completed wrapping sheet of this invention consists of a fibrous or non-fibrous, woven or unwoven cellulosic base coated or impregnated with an amount of water-soluble broad spectrum antibiotic corresponding to 5 to 25 mg. per square meter, associated with 5 to 10% of water and about 8 to 25% of water-soluble softener, percentages being by weight of the completed sheet. The softener consists of a water-soluble polyhydric alcohol containing two to six carbon atoms or a mixture thereof, such as glycerol, propylene glycol, triethylene glycol, butylene glycol, mannitol, sorbitol or pentaerythritol, the first two being the preferred softeners.

The mechanism by which the antibiotic extends the shelf-life of fresh meats enclosed in a wrapper in accordance with this invention includes as one step the diffusion after packaging within a short time into the juices of the wrapped meat of the aqueous solution of the softener and antibiotic absorbed in the wrapper. Thus, a protective solution of antibiotic is rapidly distributed over the surface of the meat, inhibiting the growth of the bacteria which would otherwise cause spoilage.

In accordance with a preferred embodiment of this invention, an aqueous solution containing 3,000 to 5,000 parts per million of chlortetracyline in the form of its hydrochloride or other water-soluble broad spectrum antibiotic was applied to the uncoated side of MSAT–80 cellophane film (having one surface provided with a moisture-proof coating) and the film was dried at 100° F. for 15 minutes. The resulting film contained 8% by weight of water, 17% by weight of glycerine and 5 to 25 mg. per square meter of antibiotic and was used to wrap round steak, porterhouse steak, sirloin steak and hamburger. The wrapped samples were stored in a standard commercial refrigerated meat case at 37° F. and evaluated at 24 hour intervals for quality, including appearance, odor, taste and bacterial count.

The meat wrapped in film containing 5 to 25 mg. per square meter of water-soluble broad spectrum antibiotics such as tetracycline in the form of its hydrochloride, polymyxin B in the form of its sulfate, and chlortetracycline in the form of its hydrochloride was satisfactory and of unimpaired quality after 96 hours storage, and showed bacterial counts of 3,000 to 30,000 per gram after 72 to 96 hours storage. In contrast, control samples, wrapped in identical film not treated with antibiotic, deteriorated in appearance, odor and taste after being stored for 48 hours and had become putrid and unusable after 72 hours' storage, showing bacterial counts of over 300,000 per gram after 72 hours and of over 1,000,000 per gram after 96 hours storage.

Round steaks ½ inch and 1½ inches thick were wrapped and tested in the same manner and found to be equally satisfactory and unimpaired at 96 hours, with bacterial count of 4,400 per gram, whereas the control, consisting of ½ inch round steak wrapped in untreated film deteriorated extensively after storage for between 72 and 96 hours, with bacterial count of 193,000 per gram after 96 hours.

Wrappers containing antibiotic in accordance with this invention may also be used with advantage in the wrapping of frozen meat, as provision is thus made for combatting bacterial growth and resulting deterioration when the meat is thawed before cooking.

The desired concentration of antibiotic is attained mainly by controlling the concentration of the applied solution. Thus, in a roller coating process wherein the base sheet was passed at a rate of 110 feet per minute over a rotating roll carrying a layer of solution picked up from a contacting rotating roll partly immersed in the solution, the completed wrapper sheet contained in addition to water and softener within the above-stated limits, antibiotic in amounts of 6.1, 7.7, and 8.5 mg. per square meter, respectively, by treatment with solutions of 3.0, 3.5 and 4.0 grams of antibiotic per liter. The antibiotic content of the wrapper sheet was shown to be substantially uniformly distributed over the sheet area by closely agreeing analyses of a number of samples taken from different areas.

Likewise, in a coating process wherein an etched gravure roll was rotated partly immersed in the antibiotic solution, excess solution was removed by a doctor blade, and the remaining solution applied to the uncoated side of a cellophane sheet pressed against the gravure roll by a rubber-covered press roll, treatment with an aqueous solution containing 4 g./l. of antibiotic resulted at treating speeds of 112, 167 and 570 feet per minute, respectively, in finished wrappers containing 12.1, 11.9, and 10.9 mg. of antibiotic per square meter.

It is important that the antibiotic be distributed uniformly so as to be readily available to protect the entire surface of the meat enclosed by the wrapper, even though only an unpredictable portion of the meat and the wrapper surfaces will be in contact. Adequate protection is accomplished in accordance with this invention by applying the antibiotic to the base sheet in the form of a solution and by the retention of the antibiotic in the completed wrapper sheet in readily diffusible form. The readily diffusible form is defined in the appended claims as an absorbed solution, which term will be understood to embrace the water, softener and antibiotic components of the wrapper sheet regardless of the degree of tenacity whereby they are retained in the cellulose base sheet corresponding to a free, capilliary and adsorbed state. The completed sheet is dry to the touch despite the significant content of normally liquid substances therein and in the case of cellophane, the transparency is not decreased indicating that the antibiotic is retained in dissolved or highly dispersed form.

An outstanding advantage of the wrapper sheets of this invention is that the prolongation of shelf-life is obtained without any special step or treatment, the antibiotic being applied where required merely by inserting the meat in the wrapper. In the known methods of applying antibiotic to meats, additional processing is required such as dipping, spraying or injecting steps. Moreover, such prior methods involved the use of larger amounts of antibiotic for securing comparable prolongation of shelf-life. Furthermore, prior methods involved considerable waste of antibiotic in the discarded treating solutions. While prior methods have employed 2 to 50 parts by weight of antibiotic per million of meat (injection method) and 2 to 7 parts per million (dipping process), not including the material discarded, the usual package in a wrapper of this invention involves the use of 0.5 or less parts by weight of antibiotic per million parts by weight of meat.

A further significant and unexpected advantage provided by the wrapper sheets in accordance with this invention is an unprecedented extent of stabilization of the antibiotic in this new environment. Wrapper sheets of this invention containing 5 to 25 mg. per square meter of antibiotic, 5 to 10% by weight of water and 8 to 25% by weight of polyhydric alcohol softener have been stored for a year at 75° F. and 35% relative humidity without any appreciable decomposition of the antibiotic. In contrast, aqueous solutions of the same or similar concentrations start to display decomposition of the antibiotic within a day or two at 75° F. and must generally be stored in refrigerated condition. While the mechanism of the stabilizing action in the wrapper sheets of this invention is not known with certainty, it is indicated that the presence of the cellulose in the composition is an essential element and that the stabilization is effected through hydrogen bonding or other attractive forces existing between the antibiotic and cellulose molecules. Such stabilization is an important advantageous feature, as it contributes materially to the practical success of the novel wrappers in accordance with this invention in extending the shelf-life of meats packaged therein.

I claim:
1. A protective wrapper, for extending the shelf life of moisture-containing meat packaged therein, of cellulosic sheet material containing an absorbed aqueous solution of a water-soluble polyhydric alcohol softener containing 2 to 6 carbon atoms and a water-soluble broad spectrum antibiotic, said sheet containing 5 to 10% by weight of water, 8 to 25% by weight of softener, and said antibiotic in an amount corresponding to 5 to 25 milligrams per square meter of sheet surface.

2. A protective wrapper as defined in claim 1, said cellulosic sheet material having a moistureproof coating on one surface.

3. A protective wrapper, for extending the shelf life of moisture-containing meat packaged therein, of cellophane containing an absorbed aqueous solution of a water-soluble polyhydric alcohol softener containing 2 to 6 carbon atoms and a water-soluble antibiotic selected from the group consisting of tetracycline, chlortetracycline, oxytetracycline, and polymyxin B, said cellophane containing 5 to 10% by weight of water, 8 to 25% by weight of softener, and said antibiotic in an amount corresponding to 5 to 25 milligrams per square meter of sheet surface.

4. A protective wrapper for extending the shelf life of moisture-containing meat packaged therein consisting of cellophane having a moistureproof coating on one surface thereof and containing an absorbed aqueous solution of chlortetracycline and a softener, said cellophane containing 5 to 10% by weight of water, 8 to 25% by weight of softener and 5 to 25 milligrams of chlortetracycline per square meter and said softener being a polyhydric alcohol selected from the group consisting of glycerine and propylene glycol.

5. A protective wrapper for extending the shelf life of moisture-containing meat packaged therein consisting of cellophane having a moistureproof coating on one surface thereof and containing an absorbed aqueous solution of chlortetracycline and glycerine, said cellophane containing about 8% by weight of water, about 17% by weight of glycerine and 5 to 25 milligrams per square meter of chlortetracycline.

References Cited in the file of this patent

UNITED STATES PATENTS

| | | |
|---|---|---|
| 2,585,501 | Rusoff et al. | Feb. 12, 1952 |
| 2,866,708 | Broquist et al. | Dec. 30, 1958 |
| 2,906,646 | Smith et al. | Sept. 29, 1959 |

FOREIGN PATENTS 110,841   Australia _____ June 18, 1940

OTHER REFERENCES

"Food Technology," March 1954, pages 133, 134, and 135.